United States Patent [19]
Leufstedt et al.

[11] Patent Number: 6,103,277
[45] Date of Patent: Aug. 15, 2000

[54] METHOD OF PRODUCING A CHEESE AND PREPARING SAME FOR DISTRIBUTION

[75] Inventors: Göran Leufstedt, Lund, Sweden; Gert Hols, Deventer, Netherlands; Börje Bredahl, Falkenberg, Sweden

[73] Assignee: Tetra Laval Holdings & Finance S.A., Pully, Switzerland

[21] Appl. No.: 09/254,716

[22] PCT Filed: Sep. 13, 1996

[86] PCT No.: PCT/SE96/01144

§ 371 Date: Apr. 29, 1999

§ 102(e) Date: Apr. 29, 1999

[87] PCT Pub. No.: WO98/10661

PCT Pub. Date: Mar. 19, 1998

[51] Int. Cl.[7] .................................................. A23C 19/028
[52] U.S. Cl. ................................ 426/8; 426/130; 426/34; 426/36; 426/39; 426/43
[58] Field of Search .................................... 426/8, 34, 36, 426/38, 39, 40, 42, 43, 130

[56] References Cited

U.S. PATENT DOCUMENTS 5,330,780  7/1994  Yee et al. ................................. 426/582

FOREIGN PATENT DOCUMENTS

83/03523  10/1983  WIPO .
95/09537  4/1995  WIPO .

*Primary Examiner*—Keith D. Hendricks
*Attorney, Agent, or Firm*—Burns, Doane, Swecker & Mathis, L.L.P.

[57] ABSTRACT

The disclosure relates to a method of producing and preparing for distribution a cheese from milk by concentrating the milk and thereafter fermenting, evaporating and packaging the milk concentrate in finished consumer packages. The fermentation is discontinued by deactivation of present acid-forming bacteria when a predetermined pH level has been reached in the fermented milk concentrate which, after the evaporation, is subjected to a second fermentation after the addition of further acid-forming bacteria. The second fermentation is caused to proceed inside the consumer packages to a second pH level, corresponding to the pH level of the finished cheese.

20 Claims, No Drawings

METHOD OF PRODUCING A CHEESE AND PREPARING SAME FOR DISTRIBUTION

This is a 371 application of PCT/SE96/01144, filed Sep. 13, 1996.

The present invention relates to a method of producing a cheese from milk containing lactose, and preparing the cheese for distribution, the method comprising the steps of concentrating the lactose-containing milk for the formation of a retentate, fermenting the thus formed retentate using acid-forming bacteria which are added in connection with the fermentation, evaporating the fermented retentate, and thereafter packing the evaporated retentate in distribution-ready consumer packages, together with a coagulant or clotting agent and a starter which is added in connection with the packing operation.

Such a method of producing a cheese product of the cheese base type is known from, for example, International Patent Application No. WO83/03523. According to this prior art method, the lactose-containing milk is concentrated by ultrafiltration for the formation of a milk retentate which, by a subsequent diafiltration process, is reduced to the desired lactose content. After a heat treatment (pasteurization) of the lactose-reduced retentate so as to eliminate fermentation-disruptive microorganisms, the retentate is fermented using a bacteria culture which is added in connection with the fermentation. The fermentation is caused to proceed until all of the lactose is consumed or until a desired pH level of between 4.9 and 5.5 has been achieved in the fermented retentate, whereafter the fermented retentate is evaporated so as to remove water to a total solids content of 57–67% which corresponds to the total solids content of the finished cheese product. A protein-coagulating enzyme (rennet) is added to the evaporated retentate, together with other additives, the retentate then being packed for storage.

In the method according to International Patent Application WO83/03523, a cheese product of the cheese base type is produced with incomplete or no flavour development whatever. A cheese product which is produced in this way moreover possesses a granular or "floury" consistency which differs entirely from the thoroughly integrated and smooth consistency that characterizes a traditional cheese.

In accordance with the present invention, it has proved to be possible to produce a cheese which, as opposed to the cheese product according to International Patent Application WO83/03523, is a "finished" cheese possessing a traditional cheese consistency and well-developed flavour properties. It has particularly proved possible to produce such a tasty cheese and prepare it for distribution merely by a minor modification of the prior art method as disclosed above.

One object of the present invention is, therefore, to propose such a modified method of producing a tasty cheese possessing characteristic traditional consistency and well-developed organoleptic properties, and preparing the cheese for distribution.

This object is attained according to the present invention in that the fermentation of the retentate is divided up into a first and second or final fermentation, as opposed to the fermentation according to the above-disclosed International Patent Application WO83/03523 which is carried out in a single step before evaporation of the fermented retentate.

Thus, the method according to the present invention is characterized in that the fermentation is discontinued by deactivation of the acid-forming bacteria when the pH level of the fermented retentate has fallen to a predetermined level, but before all of the lactose in the retentate has been consumed, and that the evaporated retentate is fermented a second time with the aid of new acid-forming bacteria which are added immediately prior to, or in connection with the packing proper of the evaporated retentate, this second fermentation being caused to proceed entirely inside the consumer packages, to a pH level determined by the lactose content of the retentate and which corresponds to the pH level of the finished cheese.

A fermentation that is caused to proceed to a pH level that coincides with or is close to the isoelectric point of casein, as in the method according to WO83/03523 inevitably leads to a powerful contraction of formed casein micelles and, as a result, to the formation of small casein granules which in turn impart to the finished product a granular of "floury" conistency, which will become more pronounced at higher temperatures, 60–70° C. Such a contraction of formed casein micelles and consequential granular consistency in the cheese is effectively avoided according to the present invention in that the fermentation of the concentrated retentate is already discontinued before the pH level of the fermented retentate has had time to fall to close to the isoelectric point of casein; but before the lactose content in the fermented retentate has been wholly consumed. A further advantage which is afforded by discontinuing the fermentation of the concentrated retentate before the pH level has had time to fall to excessively low levels (such as the isoelectric point of casein) is that rennet, which may be employed as coagulation or clotting agent for the evaporated retentate, is thereby given better preconditions to be able to function efficiently.

An efficient evaporation requires relatively elevated temperatures and becomes more efficient the higher the evaporation temperature employed. However, in excessively elevated evaporation temperatures, such as in the method according to WO83/03523, there is a serious risk that the natural flavour development which takes place during the fermentation of the concentrated retentate is weakened or lost entirely. To get a good flavouring a high count of living bacteria during ripening is needed.

According to the present invention, the problem of loss of flavour as a result of excessively elevated evaporation temperatures is solved by means of the second fermentation during which the actual flavour development may take place under mild fermentation conditions inside the consumer packages, whereby the fermentation prior to evaporation, as well as the evaporation temperatures which are employed in the subsequent evaporation of the fermented retentate, will be less critical to the flavour qualities and properties of the finished product. Thus, according to the present invention, evaporation of the fermented retentate may be carried out efficiently at reasonably elevated temperatures, at the same time as good flavour development is ensured by means of the second fermentation inside the consumer packages.

As was intimated above, the fermentation of the concentrated retentate is discontinued prior to the evaporation by heating to a sufficiently elevated temperature so as deactivate or neutralize the acid-forming bacteria in the fermented retentate. Examples of such thermal deactivation temperatures may be between 60 and 65° C., to which the fermented retentate is heated and kept at for 30 minutes or longer.

The expression "lactose-containing milk" is taken, according to the present invention, to signify milk as such, or milk which, prior to concentration, has been treated according to known milk treatment techniques, such as standarization, pasteurization, homogenization etc., but which still contains natural lactose.

Since spores normally occur in milk, and moreover survive a conventional pasteurization treatment, it may be appropriate according to the present invention to subject the milk, for purposes of extending its shelf life, to a spore-reduction pretreatment. Examples of shelf life extending pretreatment are microfiltration employing a conventional microfilter which possesses such pore size that spores cannot pass through the microfilter when the milk is caused to flow in contact with the one side of the filter, at the same time as a pressure gradient is applied transversely of the filter. Therefore no addition of nitrate is needed in this process.

The pH related lactose content is adjusted according to the present invention preferably by a diafiltration of the milk during the concentration (ultrafiltration). Water is added to the milk (the retentate) treated during the concentration, the water "washing out" parts of the residual quantity of lactose to the desired final lactose content. As was mentioned previously, the above-disclosed lactose level is selected in such a manner that, after complete fermentation, i.e. consumption of all lactose, it imparts to the finished cheese the desired pH level, $\leq 5.4$.

After adjustment of the lactose content in the concentrated milk by diafiltration, acid-forming bacteria are added for fermentation of the milk under partial consumption of the adjusted lactose content in the milk. The present invention is not restricted to any particular type of such acid-forming bacteria, but these may in principle be selected freely from among conventional bacteria of both a mesophilic and thermophilic nature. preferably, a starter culture is used containing strains of Lactobacilli, Lactococci and/or Streptococci which are able to grow in UF-milk. More preferably, a starter culture containing *Lactococcus lactis* subsp. *cremoris* and/or *Lactococcus lactis* subsp. *lactis* is used as the acid forming bacteria in the first fermentation step.

During the fermentation of the lactose-adjusted, concentrated milk, the pH level of the milk falls gradually because of acids which are formed by degrees as the fermentation proceeds. When this pH level has fallen to a predetermined level, the fermentation is discontinued by deactivation of the acid-forming bacteria, while lactose still remains in the milk. As has already been pointed out, the fermentation is discontinued when the pH level has fallen to a level which should be higher than (distinct from) the isoelectric point of casein, so as to avoid undesirable precipitation of casein, and thereby undesirable granulate of floury structure in the finished cheese, as is the case in the prior art method as described in the foregoing. The prefermentation is going on to pH 5.9–6.2 to get a lower viscosity. Suitable fermentation conditions for the lactose-adjusted, concentrated milk according to the invention are a fermentation temperature of approximately 20–50° C. for approximately 4–10 hr. so as to achieve a pH level of approximately 5.6–6.3, at which the fermentation is discontinued by deactivation of the acid-forming bacteria. The deactivation preferably takes place by heating of the fermented milk to a temperature at which all acid-forming bacteria (mesophilic and/or thermophilic) in the milk are deactivated. A deactivation at the above-disclosed pH level will be attained according to the present invention in that the fermented milk is heated to and kept at a temperature of approximately 60–65° C.

After the fermentation, the fermented milk is evaporated so as to remove water for adjustment of the total solids content (TS content) of the milk to a level which is determined by the desired total solids content (TS content) in the finished cheese. Suitable evaporation conditions for the fermented milk according to the invention may be an evaporation temperature of approximately 40–65° C., at which the milk is kept for a sufficient length of time to remove water in a sufficient quantity to achieve the desired total solids content (TS content).

The evaporated milk at desired total solids content, e.g. 40–60% is thereafter (possibly after a prior cooling) admixed with additional acid-forming bacteria, together with a coagulation or clotting agent and other additives, i.e. herbes etc. selected for the cheese production process, whereafter the thus obtained blend is mixed and filled into distribution-ready consumer packages for coagulation and further fermentation under actual flavour development inside these packages. The acid-forming bacteria for the flavour and aroma developing fermentatation may be selected from among conventional cheese cultures such as those in the earlier fermentation. In a preferred embodiment, a mixture of starter cultures are added to the concentrate: an acid-forming bacteria comprising culture, preferably containing *Lactococcus lactis* subsp. *cremoris* and/or *Lactococcus lactis* subsp. *lactis;* together with a cheese flavour developing and bitterness preventing culture, which preferably contains strains of *Streptococcus thermophilus* and/or *Lactobacillus helveticus.* For a good flavour development the acid-forming bacteria should grow out to a total count of $10^8$–$10^9$ cfu/g and the cheese flavour developing and bitterness preventing culture should have a total count of $10^6$–$10^7$ cfu/g. As coagulation or clotting agent, a protein-coagulating enzyme, preferably rennet, may be selected. Other additives may be selected from among conventional additives for cheese production, depending upon the desired nature and properties of the finished cheese. Good coagulation and well-developed flavour and consistency will be attained according to the invention by keeping the filled consumer packages after filling at a coagulation temperature of approximately 35–40° C. for approximately 30–60 min., and thereafter storing the consumer packages at room temperature (approximately 20–25° C.) for 24 hr., prior to the final fermentation. The final fermentation inside the consumer packages is automatically discontinued when all lactose has been consumed at the desired pH level in the cheese, e.g. pH 5.4, which is predetermined by the earlier lactose adjustment of the concentrated milk. After completed fermentation and lowering of the temperature, the cheese is finally stored at 14–20° C.

The present invention will be further illustrated with the aid of one embodiment which describes a method of producing a cheese and preparing it for distribution, according to one preferred embodiment of the present invention.

In this Example, use is made of conventionally pretreated, i.e. standardized and pasteurized, cows' milk as lactose-containing milk. The standardized/pasteurized milk is microfiltered with the aid of a conventional microfiltrator apparatus in order, for the purpose of extending shelf life, to remove microorganisms present in the milk, in particular spores, which are to be found in the untreated, raw milk. The microfiltered, spore-reduced milk is concentrated by ultrafiltration in a per se known manner for the formation of a retentate (concentrated milk) with a total solids content (TS content) of approximately 38–42%. During the ultrafiltration the lactose content of the milk is adjusted by diafiltration. The lactose content, in this Example, was selected so that a pH level of 5.2–5.6 is achieved in the finished cheese after fermentation of all lactose. The lactose-adjusted retentate can be pasteurized by heat treatment before acid-forming bacteria are added for fermentation of the retentate at approximately 30° C. Salt is added to the retentate, partly before the fermentation and partly after the fermentation. When the pH level has fallen to approximately 5.6–6.0 after approximately 4–6 hr., the fermentation is discontinued by heating the fermented retentate to approximately 60–65° C. After a good 30 minutes at this temperature, the acid-forming bacteria have been deactivated.

The fermented retentate, after deactivation, is evaporated at 45–65° C. so as to remove water for adjusting the total solids content (TS content) of the retentate to a level corresponding to the desired total solids content (TS content) in the finished cheese; in this example between 40 and 60%. When the desired total solids content has been achieved, the evaporated retentate is cooled to approximately 40° C. and acid-forming bacteria and an additional starter culture are added, together with a coagulation or clotting agent, preferably rennet, and other additives selected for the cheese production process.

The milk concentrate with added components, i.e. acid-forming bacteria, coagulation agent (rennet) and other additives, is blended and filled into distribution-ready consumer packages which are then sealed. The consumer packages may be of optional dimensions, but generally display such a size as to accommodate portions of 0–15 kg each.

The filled consumer packages are stored at ambient temperature (20–25° C.) for approximately 24 hr., for coagulation of the filled cheese mass and for final fermentation for the formation of the finished cheese prepared for distribution, alt a predetermined pH level of approximately 5.4. Thereafter, the cheese is stored in its package at 14–20° C. for maturing into ready-to-consume products.

It will thus be apparent from the above description and non-restrictive Example that the method according to the present invention makes for the production of cheese possessing a traditional cheese structure and well-developed flavour and organoleptic properties. In particular, the present invention makes possible rational production and distribution of consumption-ready cheese with but a minor modification of the prior art method as disclosed in previously described International Patent Application No. WO83/03523.

While the present invention has been described with reference to particular process parameters in the illustrative Example above, it will be obvious to a person skilled in the art that the present invention, in its broadest scope, is not restricted exclusively thereto. Numerous different modifications and amendments may naturally be put into effect without departing from the spirit and scope of the appended claims and without departing from the general inventive concept as herein disclosed.

What is claimed is:

1. A method of producing a cheese from milk containing lactose and preparing the cheese for distribution, the method comprising the steps of: (a) concentrating the lactose-containing milk to form a retentate, (b) fermenting the retentate using acid-forming bacteria which are added in connection with the fermentation, (c) evaporating the fermented retentate to remove water, and (d) thereafter packing the evaporated retentate in distribution ready consumer packages together with a coagulant or clotting agent which is added in connection with the packing, wherein the fermentation in step (b) is discontinued by deactivation of the acid-forming bacteria when the pH level of the fermented retentate has fallen to a first predetermined level; and that the evaporated retentate which is obtained from step (c) is fermented a second time with the aid of a second acid-forming bacteria which are added immediately prior to or in connection with the packing at step (d), said second fermentation being caused to proceed entirely inside said consumer packages, to a second pH level which is lower than the first predetermined pH level.

2. The method as claimed in claim 1, wherein the fermentation in step (b) is discontinued by heating of the fermented retentate.

3. The method as claimed in claim 1, wherein the lactose-containing milk is concentrated by ultrafiltration (UF) at step (a).

4. The method as claimed in claim 3, wherein lactose content of the milk is adjusted by diafiltration of the ultrafiltered milk at step (a).

5. The method as claimed in claim 4, wherein the lactose content of the milk is adjusted at a level which determines the pH level of the finished cheese after the second fermentation inside said consumer packages.

6. The method as claimed in claim 1, wherein the lactose-containing milk is subjected to a microorganism separation treatment prior to the concentration at step (a).

7. The method as claimed in claim 6, wherein the microorganism separation treatment includes microfiltration of the lactose-containing milk.

8. The method as claimed in claim 1, wherein the lactose-containing milk comprises standardized/pasteurized milk.

9. The method as claimed in claim 1, wherein the acid-forming bacteria are selected from among mesophilic and thermophilic bacteria.

10. The method as claimed in claim 1, wherein the acid-forming bacteria contain strains selected from the group consisting of Lactobacilli, Lactococci, Streptococci and a mixture thereof.

11. The method as claimed in claim 1, wherein the acid-forming bacteria added in step (b) contain strains selected from the group consisting of *Lactococcus lactis* subsp. *cremoris, Lactococcus lactis* subsp. *lactis,* and mixtures thereof.

12. The method as claimed in claim 9, wherein the fermentation at step (b) is discontinued by heating of the fermented retentate to a temperature in the range of 60–75° C.

13. The method as claimed in claim 1, wherein the coagulation or clotting agent consists of a protein-coagulating enzyme.

14. The method as claimed in claim 1, wherein the filled consumer packages are kept at a temperature in the range of 35–60° C. for 30–60 min. for coagulation of the packed mass.

15. The method as claimed in claim 14, wherein the consumer packages, after said coagulation, are kept at a temperature in the range of 20–25° C. for 12–24 hr., for the second fermentation.

16. The method as claimed in claim 1, wherein the fermented retentate in step (b) is, after the deactivation of the acid-forming bacteria, cooled to a temperature of 38–42° C. prior to the addition of the coagulation agent and the new acid-forming bacteria.

17. The method as claimed in claim 11, wherein the acid-forming bacteria in step (d) contain strains selected from the group consisting of *Lactococcus lactis* subsp. *cremoris* and *Lactococcus lactis* subsp. *lactis,* wherein said strains are in combination with a cheese flavor developing and bitterness preventing culture containing strains of *Streptococcus thermophilus* and/or *Lactobacillus helveticus.*

18. The method as claimed in claim 13, wherein the coagulation or clotting agent is rennet.

19. The method as claimed in claim 1, wherein the acid-forming bacteria in steps (b) and (d) are different.

20. The method as claimed in claim 1, wherein the acid-forming bacteria in steps (b) and (d) are the same.

* * * * *